Patented May 10, 1932

1,857,428

UNITED STATES PATENT OFFICE

ROBERT H. BUTTERS, OF ATLANTA, GEORGIA

MILLING CUTTER FOR FORMING GIN OR LINTER SAW TEETH

Application filed August 26, 1929. Serial No. 388,418.

This invention relates to improvements in milling cutters for forming or renewing gin or linter saw teeth, proposing a cutter which is especially applicable to the formation of saw teeth according to the method disclosed in the patent of Butters No. 1,277,375 as practiced by the machine disclosed in the patent of Butters No. 1,419,917.

The teeth of such milling cutters have been of varying forms in order to produce saw teeth of varying structures, according to the production requirements of the linter gin and the conditions attending the use of the same. Except for variations in the form of their teeth such milling cutters, as heretofore used, have been of a similar construction which is shown, for example, in the patent of Butters No. 1,346,396.

Up to a comparatively recent date linter saws were mounted in gangs, each consisting of one hundred and six saws and the prior construction of milling cutters was of a form particularly adapted to the spacing of the saws in the gang described. Such prior milling cutters gave good service. According to modern practice, however, the number of saws in the gang has been substantially increased without any increase in the length of the mandrel upon which the saws are mounted. At the present time gangs comprising one hundred and forty saws are largely in use and since the length of the mandrel is not increased the saws are proportionately more closely spaced.

This lessening of the spaces between the saws requires a corresponding reduction in the diameters of the cutters without any reduction in the length of the cutter teeth. It was found that when a cutter of the type disclosed in the Butters Patent No. 1,346,396 was sufficiently reduced in size to meet the new requirements its hub was so reduced that it would not withstand the ordinary strains of use to which it was subjected, this condition being aggravated by the fact that the square hole in the center of the cutter, utilized for mounting the same upon a spindle, had to be of the same size as the hole in the former larger cutters in order that the smaller cutters might be adapted to standard saw sharpening machines.

The principal object of the invention is to produce a milling cutter of the desired form reinforced in such a manner that although smaller in diameter and having smaller hubs than the cutters used in conjunction with linter gangs of one hundred and six saws, it can be mounted upon the same spindles as the latter cutters and is adequately strong for the purposes in view, this object contemplating the provision of an integral annular rib upon the upper side of the cutter which rib may replace the extended reinforcing hub formed heretofore at the bottom of the larger cutters.

The present invention is not concerned with any particular cutter tooth construction, it being obvious that any form of cutter tooth may be employed just as in the prior construction. Instead the invention proposes a cutter of a new type to meet new and changed conditions which cannot be satisfactorily served by the prior construction.

The invention is illustrated in the accompanying drawings, in which:—

Figure 1:
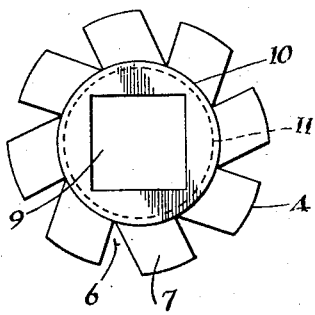
Figure 1 is a top view of a cutter reinforced in accordance with the invention.
Figure 2:
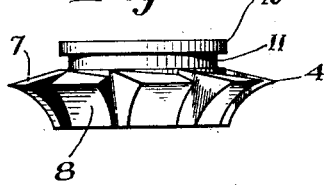
Figure 2 is a side elevation of the same.
Figure 3:
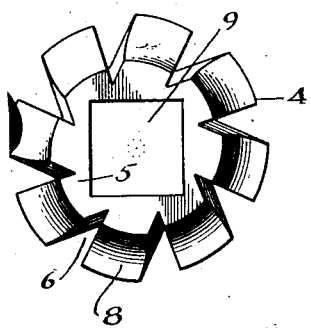
Figure 3 is a bottom view of the cutter.

The cutter as illustrated in the accompanying drawings is of the angular bevel type and includes a suitable number of cutting teeth 4 which radiate from a central or hub portion 5 and which are separated by V-shaped notches 6, each of said teeth having an upper face 7 and an under face 8. The cutter is provided with a central bore 9 to permit its being mounted upon the usual spindle in the milling machine. According to the invention the cutter has on its upper side an integral annular hub extension in the form of a rib and I have found that this hub extension even though of narrow thickness adequately reinforces the cutter. The reinforcing rib may be of uniform thickness throughout but it is preferably provided with an annular recess 11 adjacent the upper faces of the teeth in order to provide a suitable clearance adjacent the cutting edges to permit the formation of the required relief on the teeth while at the same time not materially decreasing the reinforcement provided by the rib.

The position of the reinforcing rib is particularly advantageous in that it permits the utilization of smaller cutters of the same types as to the various cutting tooth formations as are employed in connection with linter saw gangs of one hundred and six saws, the smallness in size of the cutters and the reduction of their hubs in no way impairing their strength, notwithstanding the fact that their central bores by which they are mounted upon their respective spindles are of the same size as those in the larger cutters.

Although emphasis has been placed upon the fact that the annular reinforcing rib is especially advantageous as a strengthening means for the small cutter necessary where a larger number of saws is employed in a gang, it is, of course, obvious that any desired size of cutter may be suitably strengthened by the employment of this reinforcing rib. In the larger cutters employed heretofore the hubs were somewhat elongated, i. e., suitably downwardly extended to secure greater strength. Such downward extension of the hubs in the present smaller cutters has no adequate reinforcing effect and may be eliminated as shown in the drawings.

Having fully described my invention, I claim:—

1. A milling cutter for forming or renewing gin or linter saw teeth including a hub portion and a plurality of teeth radiating therefrom, the said hub being extended to provide an integral annular reinforcing rib at the upper side of said cutter which rib is so located at its juncture with the body of the cutter as to avoid interference with providing the required relief on the teeth.

2. A milling cutter for forming or renewing gin or linter saw teeth including a hub portion and a plurality of teeth radiating therefrom, the said hub being extended to provide an integral annular reinforcing rib upon the upper side of said cutter and said rib having an annular recess adjacent the upper faces of said teeth.

In testimony whereof I affix my signature.

ROBERT H. BUTTERS.